United States Patent
Goranov

(10) Patent No.: US 11,206,129 B2
(45) Date of Patent: *Dec. 21, 2021

(54) FIRST ENTITY, A SECOND ENTITY, AN INTERMEDIATE NODE, METHODS FOR SETTING UP A SECURE SESSION BETWEEN A FIRST AND SECOND ENTITY, AND COMPUTER PROGRAM PRODUCTS

(71) Applicant: Ubiqu B.V., Rotterdam (NL)

(72) Inventor: Boris Petrov Dokov Goranov, Rotterdam (NL)

(73) Assignee: Ubiqu B.V., Rotterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/570,055

(22) PCT Filed: Apr. 29, 2016

(86) PCT No.: PCT/NL2016/050307
§ 371 (c)(1),
(2) Date: Mar. 23, 2018

(87) PCT Pub. No.: WO2016/175659
PCT Pub. Date: Nov. 3, 2016

(65) Prior Publication Data
US 2018/0123794 A1    May 3, 2018

(30) Foreign Application Priority Data

Apr. 30, 2015  (NL) .................................... 2014743

(51) Int. Cl.
*H04L 9/08*        (2006.01)
*H04L 29/06*       (2006.01)
(Continued)

(52) U.S. Cl.
CPC .............. *H04L 9/0816* (2013.01); *H04L 9/14* (2013.01); *H04L 9/30* (2013.01); *H04L 9/3226* (2013.01);
(Continued)

(58) Field of Classification Search
CPC ......... H04L 9/3226; H04L 63/06; H04L 9/14; H04L 9/30; H04L 63/083; H04L 9/0816;
(Continued)

(56) References Cited

U.S. PATENT DOCUMENTS 6,167,521 A  * 12/2000  Smith ..................... G06F 21/33
                                              380/286
7,487,535 B1 *  2/2009  Isaacson ............... H04L 63/101
                                              726/4

(Continued)

OTHER PUBLICATIONS

Aug. 11, 2016—International Search Report and Written Opinion of PCT/NL2016/050307.

*Primary Examiner* — Badri Narayanan Champakesan
(74) *Attorney, Agent, or Firm* — Banner & Witcoff, Ltd.

(57) ABSTRACT

The invention relates to a method for setting up a secure session between a first entity and a second entity. In an embodiment, the first entity is a user authentication device and the second entity is an application running on a platform. The method comprises generating a first random number. A user enters a first string, derived from said first number, into the second entity. Further, the method includes applying a one-way function to the first string or to a derivative thereof, obtaining an encoded string. The method also comprises transmitting the encoded string to an intermediate node that is in connection to the first entity and the second entity. Further, the method comprises the step of sharing a second random number with the second entity. The method also comprises a step of deriving a secret key from the first and the second string.

17 Claims, 11 Drawing Sheets

(51) Int. Cl.
  *H04W 12/041* (2021.01)
  *H04L 9/14* (2006.01)
  *H04L 9/30* (2006.01)
  *H04L 9/32* (2006.01)
  *H04W 12/06* (2021.01)
  *G06F 7/58* (2006.01)

(52) U.S. Cl.
  CPC .......... *H04L 63/0428* (2013.01); *H04L 63/06* (2013.01); *H04L 63/083* (2013.01); *H04L 63/0869* (2013.01); *H04W 12/041* (2021.01); *H04W 12/06* (2013.01); *G06F 7/588* (2013.01); *H04L 2209/80* (2013.01)

(58) Field of Classification Search
  CPC ............. H04L 63/0869; H04L 63/0428; H04L 2209/80; H04W 12/06; H04W 12/04; G06F 7/588
  USPC .......................................................... 713/168
  See application file for complete search history.

(56) References Cited

U.S. PATENT DOCUMENTS

| | | | | |
|---|---|---|---|---|
| 8,230,490 B2* | 7/2012 | Zapata | .................... | H04L 69/22 |
| | | | | 726/9 |
| 8,280,053 B1* | 10/2012 | Giraud | ................. | H04L 9/3271 |
| | | | | 380/247 |
| 8,555,350 B1* | 10/2013 | Shatzkamer | ........ | H04L 67/1027 |
| | | | | 726/5 |
| 9,124,582 B2* | 9/2015 | Kalinichenko | ......... | H04L 63/18 |
| 9,270,663 B2* | 2/2016 | Kravitz | ................... | H04L 9/006 |
| 9,300,653 B1* | 3/2016 | Dufel | ................... | H04L 63/0823 |
| 2004/0117623 A1* | 6/2004 | Kalogridis | ............ | H04L 9/3297 |
| | | | | 713/165 |
| 2004/0228490 A1* | 11/2004 | Klemba | ................ | H04L 63/104 |
| | | | | 380/270 |
| 2005/0149732 A1* | 7/2005 | Freeman | ............. | H04L 63/0442 |
| | | | | 713/171 |
| 2005/0265546 A1* | 12/2005 | Suzuki | .................. | H04L 9/0662 |
| | | | | 380/44 |
| 2006/0143453 A1* | 6/2006 | Imamoto | ............. | H04L 9/0891 |
| | | | | 713/169 |
| 2008/0260149 A1* | 10/2008 | Gehrmann | ......... | G06Q 20/3821 |
| | | | | 380/247 |
| 2009/0287837 A1* | 11/2009 | Felsher | .................. | G06Q 10/10 |
| | | | | 709/229 |
| 2010/0205439 A1* | 8/2010 | Chu | ...................... | H04L 9/3273 |
| | | | | 713/169 |
| 2011/0296186 A1* | 12/2011 | Wong | .................. | H04L 63/0272 |
| | | | | 713/171 |
| 2013/0022197 A1* | 1/2013 | Yamamoto | ................ | G06F 7/58 |
| | | | | 380/44 |
| 2013/0143532 A1* | 6/2013 | Liu | ..................... | H04W 12/122 |
| | | | | 455/411 |
| 2013/0318588 A1* | 11/2013 | Metzger | ................ | G06F 21/313 |
| | | | | 726/7 |
| 2014/0208409 A1* | 7/2014 | Maidl | ................. | H04L 63/0853 |
| | | | | 726/9 |
| 2015/0281188 A1* | 10/2015 | Sakemi | ..................... | H04L 9/14 |
| | | | | 713/171 |
| 2016/0050067 A1* | 2/2016 | Merchan | ................ | H04L 9/0861 |
| | | | | 713/171 |
| 2016/0269231 A1* | 9/2016 | Bahr | .................. | H04L 12/2807 |
| 2016/0285845 A1* | 9/2016 | Goranov | ................ | H04L 63/10 |
| 2018/0123794 A1* | 5/2018 | Goranov | ................. | H04L 9/30 |

* cited by examiner

FIRST ENTITY, A SECOND ENTITY, AN INTERMEDIATE NODE, METHODS FOR SETTING UP A SECURE SESSION BETWEEN A FIRST AND SECOND ENTITY, AND COMPUTER PROGRAM PRODUCTS

CROSS-REFERENCE TO RELATED APPLICATIONS

This application is a U.S. National Stage application under 35 U.S.C. § 371 of International Application PCT/NL2016/050307 (published as WO 2016/175659 A1), filed Apr. 29, 2016 which claims the benefit of priority to Application NL 2014743, filed Apr. 30, 2015. Benefit of the filing date of each of these prior applications is hereby claimed. Each of these prior applications is hereby incorporated by reference in its entirety.

The present invention relates to a method for setting up a secure session between a first and a second entity.

For the purpose of secure exchange of information on the Internet, e.g. for enabling reliable access to data, safe information storage, processing and distribution, a secure session between entities on the Internet is indispensable. As an example, a safe session has to be established, and optionally maintained, between a server on which an application is running and a user workplace, such as a PC or tablet.

It is an object of the invention to provide a method of setting up a secure session between a first and a second entity, safely and quickly. Thereto, according to the invention, a method is provided for setting up a secure session between a first entity and a second entity, the first and second entity being a user authentication device and an application running on a platform, respectively, or vice versa, the method being performed by a first entity and comprising the steps of generating a first random number, exporting a first string derived from said first random number, to a user for entering the first string into a second entity, applying a one-way function to the first string or to a derivative thereof, obtaining an encoded string, transmitting the encoded string to an intermediate node that is in connection to the first entity and a second entity, the method further comprising the steps of generating a second random number, deriving a second string from said second random number and transmitting the second string to the second entity if a verifying step of comparing encoded strings transmitted by the first entity and the second entity has a positive result, or receiving from the second entity a second string being derived from a second random number generated by the second entity, the method further comprising the step of deriving a secret key from the first and the second string.

By forwarding encoded strings to an intermediate node, it can be verified that the first and second entity share unique information in the form of the first string, even if said unique information is not known to the intermediate node. Then, a secure data transmission channel can be established from the first entity via the intermediate node to the second entity, and vice versa. By further sharing a second unique string, the first and second entity can derive a unique key that is only known to said first and second entity, thereby enabling a secure information exchange via said established transmission channel.

The invention also relates to a method being performed by the second entity, and to a method being performed by the intermediate node that is in connection to the first entity and the second entity.

In addition, the invention relates to a first entity, a second entity and an intermediate node that is in connection to the first and the second entity.

Further, the invention relates to computer program products. A computer program product may comprise a set of computer executable instructions stored on a data carrier, such as a CD or a DVD. The set of computer executable instructions, which allow a programmable computer to carry out the methods as defined above, may also be available for downloading from a remote server, for example via the Internet or via an app.

Other advantageous embodiments according to the invention are described in the following claims By way of example only, embodiments of the present invention will now be described with reference to the accompanying figures in which FIG. 1 shows a network comprising a first entity according to the invention, a second entity according to the invention and an intermediate node according to the invention;

It is noted that the figures show merely a preferred embodiment according to the invention. In the figures, the same reference numbers refer to equal or corresponding parts.

Figure 1:
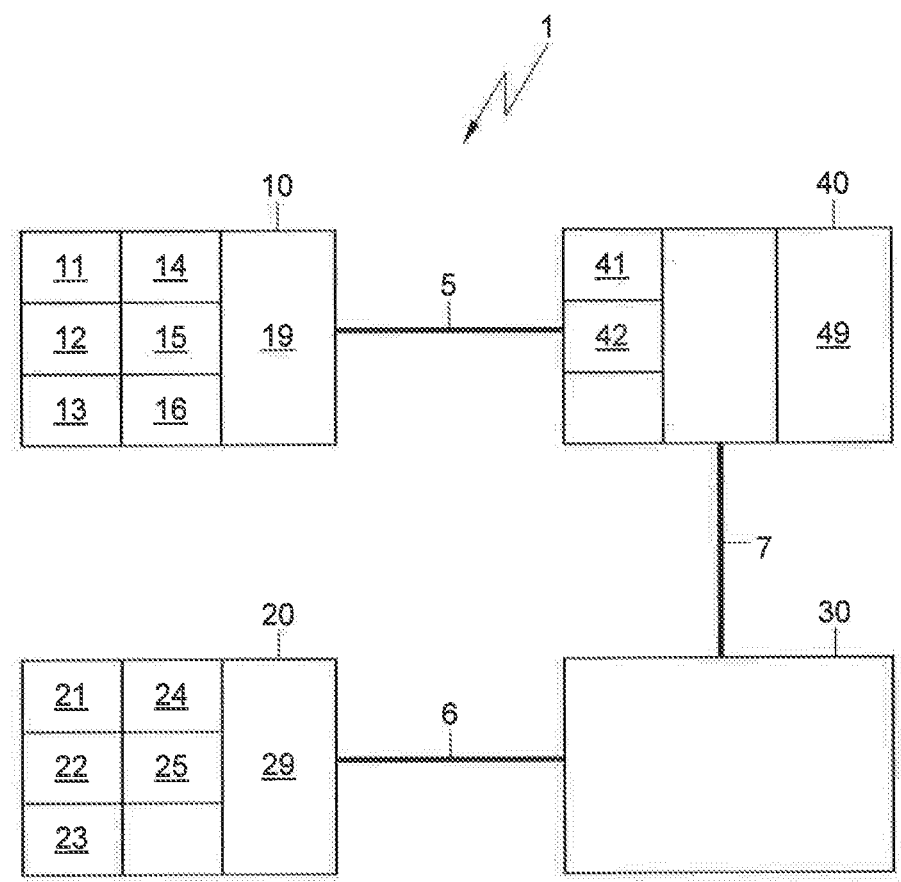

FIG. 1 shows a network 1 comprising a first entity 10 according to the invention, a second entity 20 according to the invention and an intermediate node 40 according to the invention. In the shown embodiment the first entity 10 is a user workplace application, such as a PC, a tablet, a cash desk or another application that is running on a hardware device operated by a user. Further, in the shown embodiment, the second entity 20 is a user authentication device, such as a cellular phone, a PDA, a smart card, a token, an electronic key or another personal device serving for authentication purposes. The network 1 also comprises an authentication server 30 associated with the second entity 20. Further, the network 1 comprises a first data transmission path 5 connecting the user workplace application 10 to the intermediate node 40, a second data transmission path 6 connecting the second entity 20 to the authentication server 30, and a third data transmission path 7 connecting the intermediate node 40 to the authentication server 30.

The first entity 10 is provided with a number of modules for setting up a secure session with a second entity 20 as described below. Thereto the first entity 10 includes a first random generator 11 for generating a first random number, an I/O interface 12 for exporting a first string derived from said first random number, to a user for entering the first string into a second entity 20, a processor 13 for applying a one-way function to the first string or to a derivative thereof, obtaining an encoded string, and a transmitting unit 14 for transmitting the encoded string to the intermediate node 40 that is in connection to the first entity 10 and the second entity 20. Further, the first entity 10 includes a receiver unit 15 for receiving from the second entity 20 a second string being derived from a second random number generated by the second entity 20. The processor 13 is further arranged for deriving a secret key from the first and the second string. Optionally, the first entity 10 is provided with a second random generator 16 for generating a second random number as described below.

Also the second entity 20 is provided with a number of modules for facilitating a procedure of setting up a secure session with the first entity 10. Thereto, the second entity 20 includes an I/O interface 21 for receiving a first string derived from a first random number generated by a first entity 10, a processor 22 for applying a one-way function to the first string or to a derivative thereof, obtaining an encoded string, a transmitting unit 23 for transmitting the encoded string to an intermediate node that is in connection to a first and the second entity. Further, the second entity 20 includes a second random generator 24 for generating a second random number. The processor 22 is arranged for deriving a second string from said second random number and for transmitting the second string to the first entity 10 if a verifying step of comparing encoded strings transmitted by the first entity 10 and the second entity 20 has a positive result. The processor 22 is further arranged for deriving a secret key from the first and the second string. In addition, the second entity 20 is provided with a receiver unit 25.

The intermediate node 40 that is in connection to a first and second entity for setting up a secure connection between the first and the second entity 10, 20 comprises a receiving unit 41 for receiving an encoded string from the first and the second entity 10, 20, and a processor 42 for verifying whether the encoded strings received from the first and second entity 10, 20 match to each other. If the encoded strings correspond to each other, a secure session can be set up. The processor 42 is further arranged for authorizing the first and second entity 10, 20 to share a second string being derived from the second random number generated by the second entity 20, if the verifying step has a positive result.

The first entity 10, the second entity 20 and the intermediate node 40 are each provided with a processing unit 19, 29, 49 for controlling operation of the respective entity or node in the network 1.

It is noted that in another embodiment of the invention, the first entity 10 is the user authentication device while the second entity 20 is the platform application. Then, the first entity 10 not only generates the first random number, but also the second random number. The second random number is forwarded as a second string to the second entity 20, either via manually entering the second string into the I/O interface 21 of the second entity 20 or via transmittal of a digital path, preferably in encrypted format. Also in this embodiment, the secure session is set up between a user authentication device and a platform application via a first data transmission path 5, a second data transmission path 6 and a third data transmission path 7. The platform application of the secure session can e.g. be chosen to be a user workplace application, a cloud application, an authentication provider application, or a transaction system application.

The first string derived from the first random number, generated by the first entity 10, can be implemented as a random message produced from said first random number. The first string can also be produced as another representation of the first random number. Alternatively, the first string and the first random number are identical.

Further, the derivative of the first string can be generated by applying a hash function or a similar function to the string. Otherwise, the derivative of the first string is identical to the string itself. A one-way function is applied to the derivative of the first string to obtain an encrypted string.

The second string can be transmitted in an encrypted manner. Alternatively, the second string is exported to a user, e.g. via a display for entering the string in the first or second entity 10, 20.

In the above described embodiment, the intermediate node 40 can be a server on which a specific application is running, e.g. a document management application for managing storage, processing and/or distribution of documents in the cloud. Alternatively, the intermediate node 40 is the authentication provider that is securely connected to the authentication device.

When the secure session between the first and second entity 10, 20 has been established, a secure transmission channel can be used for one-way or two-way data transfer, such as a transfer of a message, a decryption and/or encryption key, or an authorization dialog. Decryption and/or encryption keys can be used to authorize a document in a cloud application.

If the platform application is a transaction system application, a user workplace application is generally remotely connected thereto. Then, a transaction process may be started, including the steps of preparing a persistent transaction instruction on the user workplace application, performing an authorization dialog between the transaction system application and the authentication device, and executing the transaction instruction only when the authorization dialog has successfully finished. The authorization dialog may include the steps of transmitting a code, from the transaction system application to the authentication device for entering the code into the user workplace application, transmitting the code from the user workplace application to the transaction system application, optionally in encrypted format, and verifying whether the code or the encrypted equivalent thereof received by the transaction system application is the same as the code transmitted by said transaction system application, or the encrypted equivalent thereof.

In a specific embodiment according to the invention, the step of transmitting the second string is implemented by exporting the second string to a user, via an I/O interface of one entity 10; 20 for manually entering the second string into an I/O interface of the other entity 20; 10, respectively.

The user authentication device is associated with the authentication server 30 as a result of an identification process that has been performed prior to setting up a secure connection between the first entity 10 and the second entity 20. Then, a secure connection is present between the user authentication device and the associated authentication server 30, so that a user of the authentication device can perform an identity or capacity process in a particular context, e.g. to have access to a safety box.

Advantageously, authentication data can be made available to the intermediate node 40, e.g. in the form of metadata, in order to inform the intermediate node 40 about an identity or capacity of the user authentication device transmitting the encoded string to the intermediate node 40.

Figure 2:
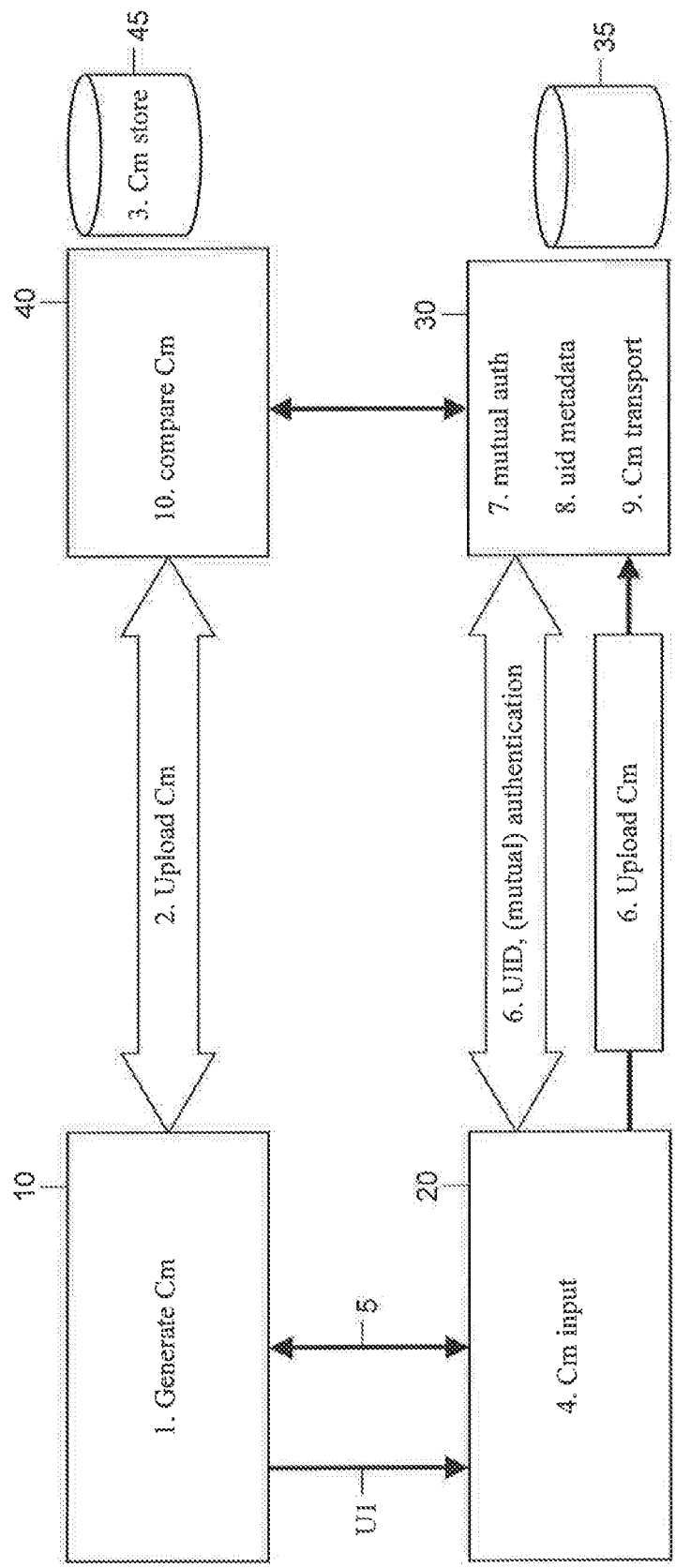
FIG. 2 shows a first process diagram according to the invention.

FIG. 2 shows a first process diagram according to the invention. Here, the first random number is generated by the first entity 10, a user platform application, uploaded as an encoded string $C_m$ to the intermediate node 40 and stored in an intermediate memory unit 45 associated with the intermediate node 40. The first random number or first string is exported to the user, e.g. via a display, and entered by the user in a first manual user action $U_1$ into the second entity 20, a user authentication device. Then, the second entity 20 forwards the encoded string $C_m$ and user identification data UID to the authentication server 30 for mutual identification, including retrieval of information from identification metadata stored in an authentication storage unit 35 associated with the authentication server 30, and transport of relevant identification metadata and the first encoded string to the intermediate node 40. Then, the intermediate node 40 performs a verification of the encoded strings received from the first and the second entity 10, 20. If the strings correspond, the intermediate node 40 authorizes the first and second entity 10, 20 to share a second random number for computing a unique key. A secure connection S is set up between the user workplace application and the user authentication device.

Figure 3:
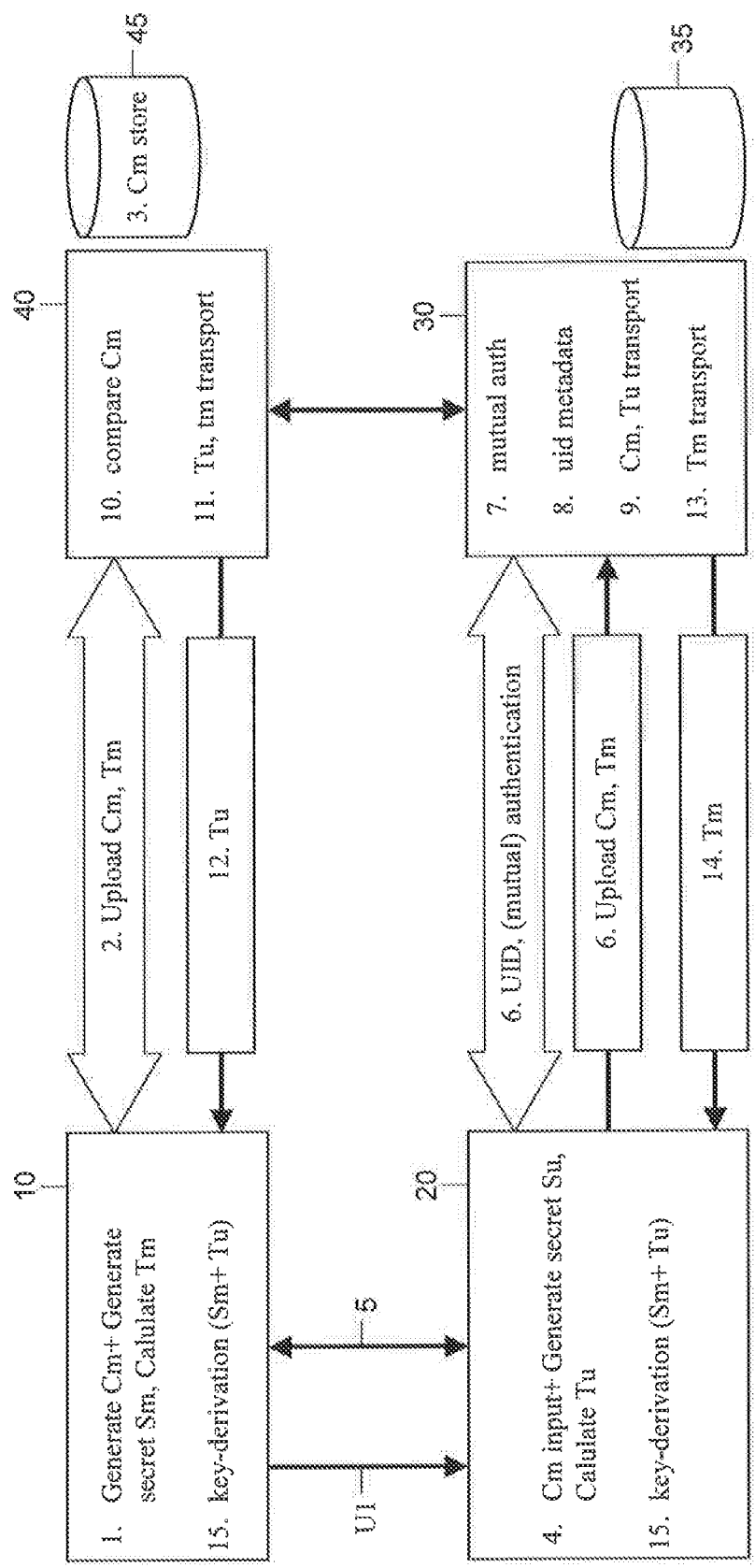
FIG. 3 shows a second process diagram according to the invention.

FIG. 3 shows a second process diagram according to the invention. Again, the first entity 10, a user workplace application, generates the first random number, and uploads the number as an encoded string $C_m$ to the intermediate node 40 for storage in the intermediate memory unit 45. Similar to the process shown in FIG. 2, the first random number or first string is exported to the user, e.g. via a display, and entered by the user in a first manual user action $U_1$ into the second entity 20, the user authentication device. Here, both the first entity 10 and the second entity 20 derive a secret key $S_m$, $S_u$ and apply the key $S_m$, $S_u$ to the number $C_m$, or equivalent thereof, obtaining the encoded string $T_m$, $T_u$, encrypted transformations of the random number $C_m$ or the equivalent of $C_m$. As an example, a diffie-hellmann key exchange can be applied. The encrypted transformations $T_m$, $T_u$, are uploaded to the intermediate node 40 and the authentication server 30, respectively. Also, user identification data UID from the second entity 20 is forwarded to the authentication server 30 for mutual identification, including retrieval of information from identification metadata stored in an authentication storage unit 35 associated with the authentication server 30, and transport of relevant identification metadata, the first encoded string $C_m$ and the encrypted transformation $T_u$, to the intermediate node 40. The intermediate node 40 performs a verification of the encoded strings $C_m$ received from the first and the second entity 10, 20. If the strings correspond, the intermediate node 40 authorizes the first and second entity 10, 20 to share a second random number. The encoded strings $T_m$, $T_u$, are uploaded to the second and first entity 20, 10, respectively. Then, both the first and the second entity 10, 20 compute a key based on the encoded strings $T_m$, $T_u$. A secure connection S is set up between the user workplace application and the user authentication device.

Figure 4:
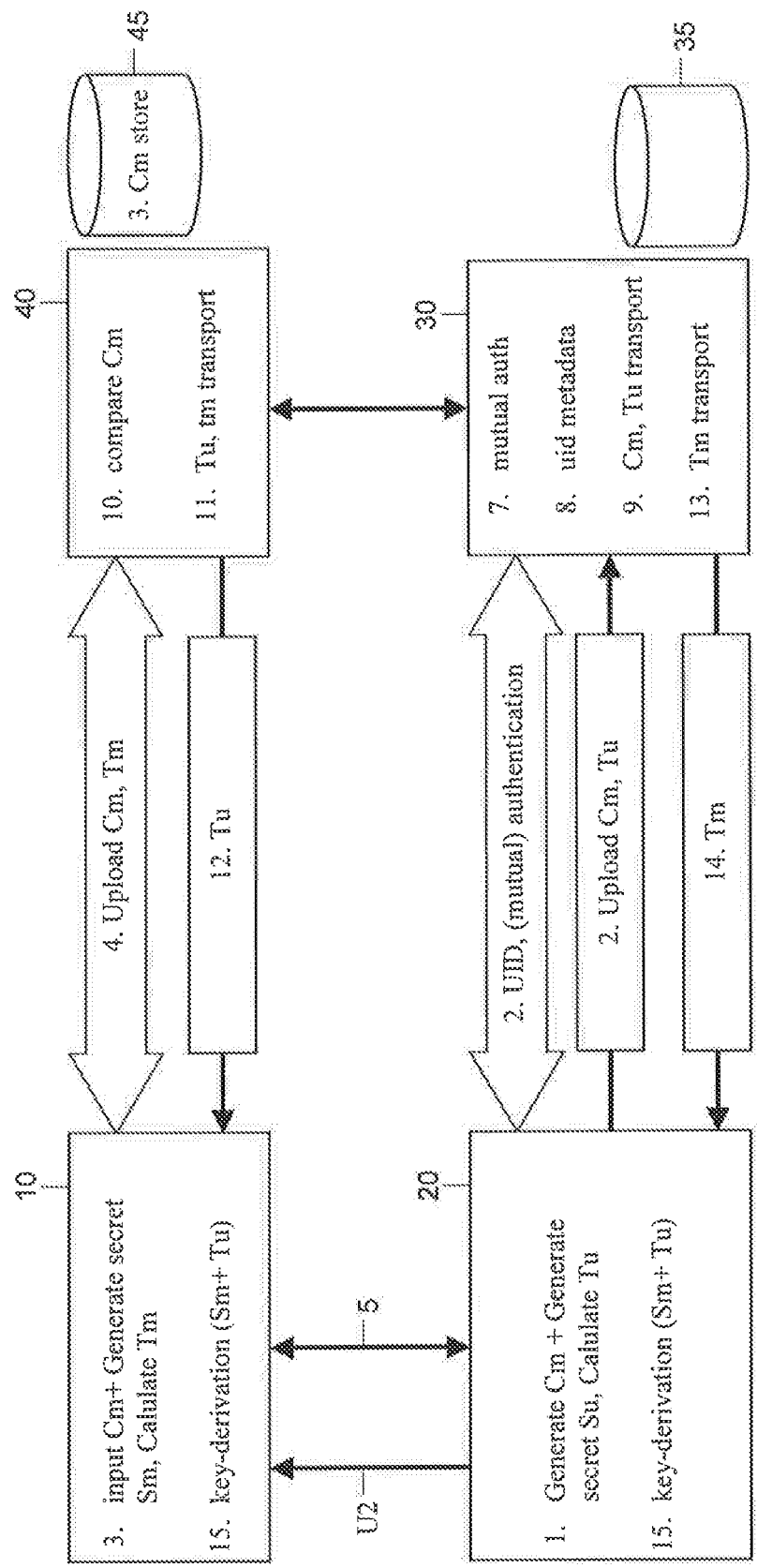
FIG. 4 shows a third process diagram according to the invention.

FIG. 4 shows a third process diagram according to the invention. Here, the first random number is generated by the second entity 20, also generating the second random number. The first string derived from said first random number is entered into the first entity 10 via a second manual user action $U_2$. The process is further similar to the second process explained referring to FIG. 3.

Figure 5:
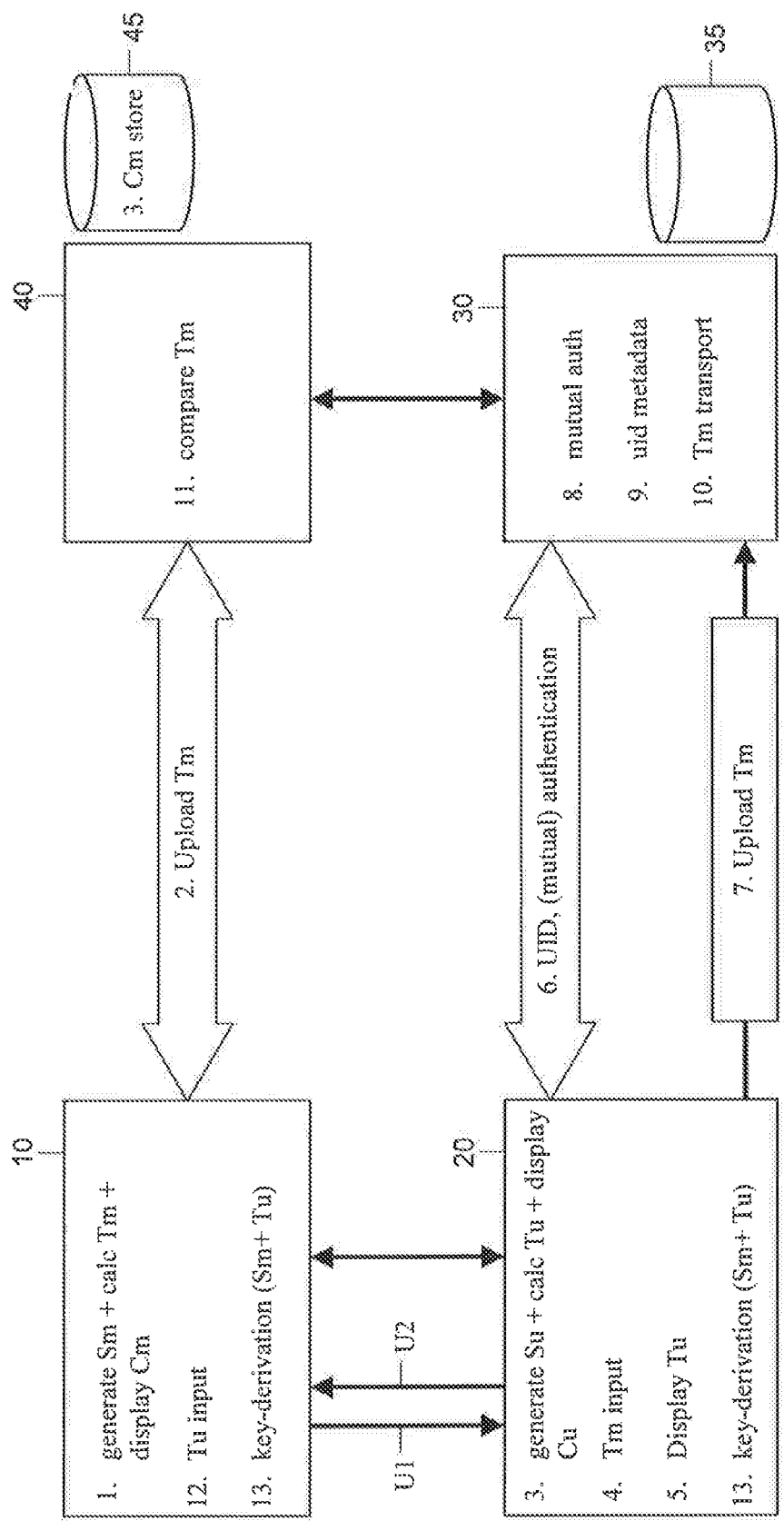
FIG. 5 shows a fourth process diagram according to the invention.

FIG. 5 shows a fourth process diagram according to the invention. Here, two strings are manually entered into the first and the second entity 10, 20. In contrast to the second process where the encrypted transformation $T_u$ is forwarded via the authentication server 30 and the intermediate node 40 to the first entity 10, the encrypted transformation $T_u$, obtained by applying a secret key $S_u$ to the number $C_m$, or equivalent thereof, is now manually entered to the first entity 10.

In the fourth process diagram, a first random number is generated by the first entity 10. The first random number or first string is exported to the user, e.g. via a display, and entered by the user in a first manual user action $U_1$ into the second entity 20, the user authentication device. Here, both the first entity 10 and the second entity 20 derive a secret key $S_m$, $S_u$ and apply the key $S_m$, $S_u$ to the number $C_m$, or equivalent thereof, obtaining the encoded string $T_m$, $T_u$, encrypted transformations of the random number $C_m$ or the equivalent of $C_m$. Also the encoded string $T_m$ is entered by the user in the first manual user action $U_1$ into the second entity 20. The encrypted transformation $T_m$ and user identification data UID are uploaded from the second entity 20 to the authentication server 30, for mutual identification, including retrieval of information from identification metadata stored in an authentication storage unit 35 associated with the authentication server 30, and transport of relevant identification metadata and the encrypted transformation $T_m$, to the intermediate node 40. The encrypted transformation $T_m$ is also uploaded from the first entity 10 to the intermediate node 40. The intermediate node 40 performs a verification of the encoded strings $C_m$ received from the first and the second entity 10, 20. If the strings correspond, the intermediate node 40 authorizes the first and second entity 10, 20 to share a second random number.

The encrypted transformation $T_u$, obtained by applying a secret key $S_u$ to the number $C_m$, or equivalent thereof, is manually entered to the first entity 10 via a second manual user action $U_2$. Based on the encoded strings $T_m$, $T_u$, both the first and the second entity 10, 20 compute a key. A secure connection S is set up between the user workplace application and the user authentication device. Here, the second string is transferred via the second manual user action $U_2$.

It is noted that the secure session can be set up between the user authentication device and a user platform application, such as a user workplace application, a cloud application, an authentication provider or a transaction application.

Figure 6:
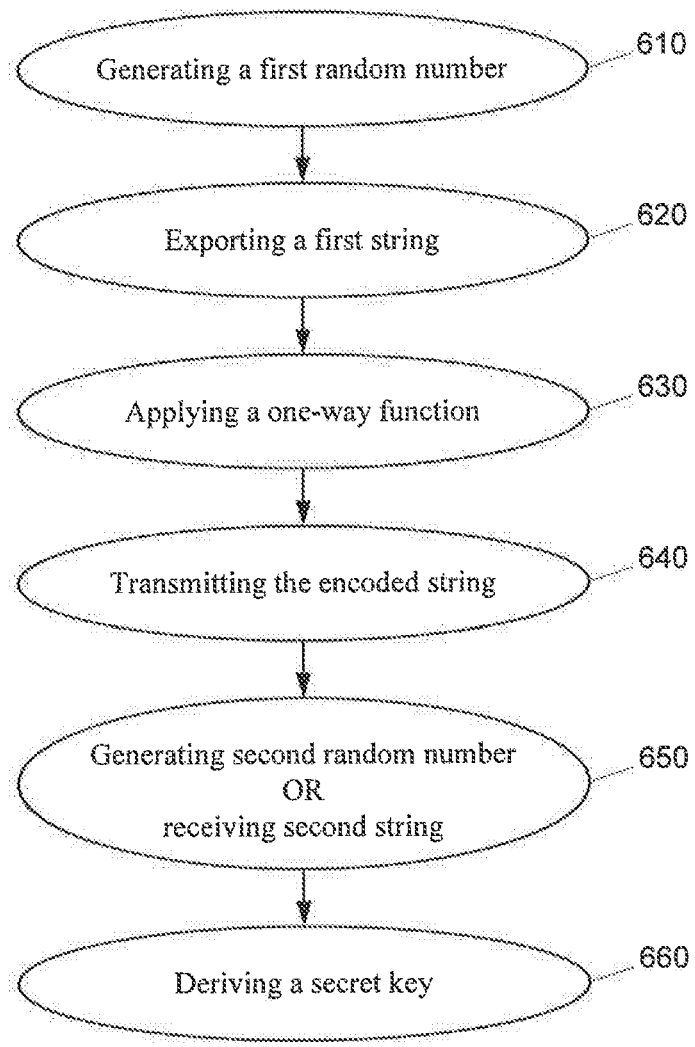
FIG. 6 shows a flow chart of a method according to the invention being performed on the first entity shown in FIG. 1.

FIG. 6 shows a flow chart of a method according to the invention being performed on a first entity. The method is applied for setting up a secure session between a first entity and a second entity, the first and second entity being a user authentication device and an application running on a platform, respectively, or vice versa, the method being performed by a first entity. The method comprises a step of generating 610 a first random number, a step of exporting 620 a first string derived from said first random number, to a user for entering the first string into a second entity, a step of applying 630 a one-way function to the first string or to a derivative thereof, obtaining an encoded string, a step of transmitting 640 the encoded string to an intermediate node that is in connection to the first entity and a second entity. The method further comprises the steps of generating 650 a second random number, deriving a second string from said second random number and transmitting the second string to the second entity if a verifying step of comparing encoded strings transmitted by the first entity and the second entity has a positive result, or the step of receiving from the second entity a second string being derived from a second random number generated by the second entity. Further, the method comprises the step of deriving 660 a secret key from the first and the second string.

Figure 7:
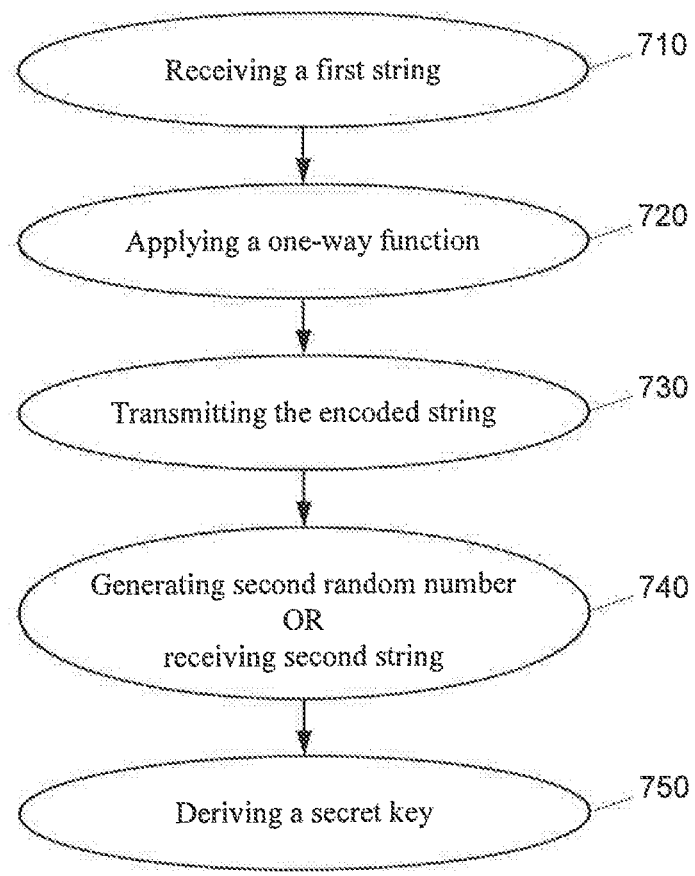
FIG. 7 shows a flow chart of a method according to the invention being performed on the second entity shown in FIG. 1.

FIG. 7 shows a flow chart of a method according to the invention being performed on a second entity. The method is applied for setting up a secure session between a first entity and a second entity, the first and second entity being a user authentication device and an application running on a platform, respectively, or vice versa, the method being performed by a second entity. The method comprises a step of receiving 710, via an I/O interface, a first string derived from a first random number generated by a first entity, a step of applying 720 a one-way function to the first string or to a derivative thereof, obtaining an encoded string, a step of transmitting 730 the encoded string to an intermediate node that is in connection to a first and the second entity. Further, the method comprises the steps of generating 740 a second random number, deriving a second string from said second random number and transmitting the second string to the first entity if a verifying step of comparing encoded strings transmitted by the first entity and the second entity has a positive result, or the step of receiving from the first entity a second string being derived from a second random number generated by the first entity. The method further comprises a step of deriving 750 a secret key from the first and the second string.

Figure 8:
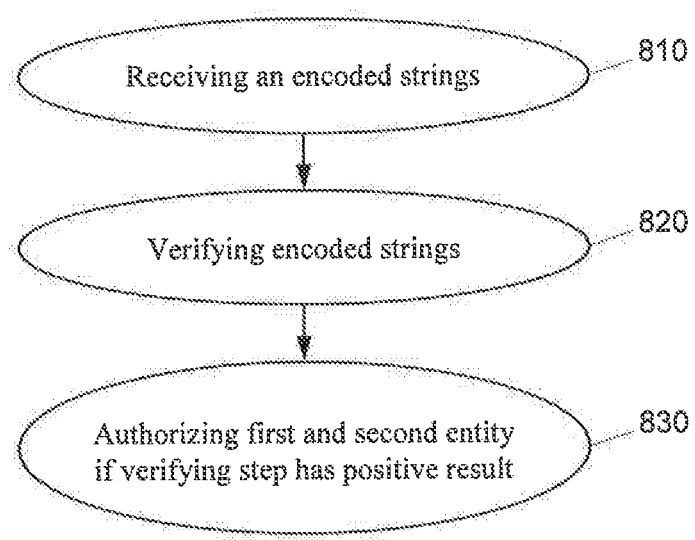
FIG. 8 shows a flow chart of a method according to the invention being performed on the intermediate node shown in FIG. 1.

FIG. 8 shows a flow chart of a method according to the invention being performed on an intermediate node that is in connection to a first entity and a second entity. The method is applied for setting up a secure session between a first entity and a second entity, the first and second entity being a user authentication device and an application running on a platform, respectively, or vice versa, the method being performed by an intermediate node. The method comprises a step of receiving 810 an encoded string from a first and second entity, the encoded string being obtained by applying a one-way function to a first string or to a derivative thereof, the first string being derived from a first random number generated by a first entity, a step of verifying 820 whether the encoded strings received from the first and second entity are the same, and a step of authorizing 830 the first and second entity to share a second string being derived from a second random number generated by the first or second entity, respectively, if the verifying step has a positive result.

Figure 9:
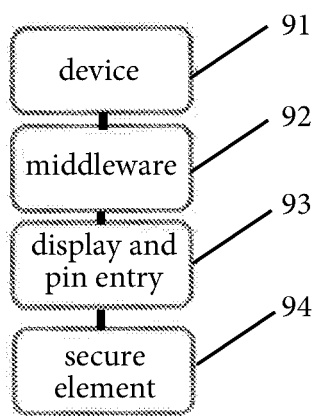
FIG. 9 shows a traditional setup, comprising a device running an application for providing a context, middleware, a display and pin entry, and a secure element.

FIG. 9 shows a traditional setup, comprising a device 91 running an application for providing a context, middleware 92 including an application programming interface API, a display and pin entry 93, and a secure element 94 interacting with an asset containing secret information.

According to an aspect of the invention a server is provided, also called qKey. qKey tightly couples or connects context and pin, orchestrates secure entry and displays and ensures use of a secure element for the asset. The qkey is a secure element with sole control technology and a secure second screen, even within the same device.

Figure 10:
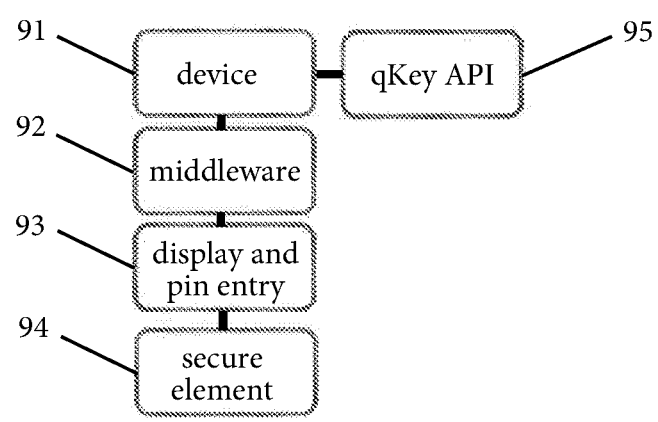
FIG. 10 shows a first setup according to an embodiment of the invention, in which the traditional smart card configuration used on a PC with middleware and a reader is used in another way.

FIG. 10 shows a first setup according to an embodiment of the invention. Here, the traditional smart card configuration used on a PC with middleware and a reader is used in another way. The first setup according to the invention includes a qKey api 95.

The middleware API is modified such that the context is entered prior to PIN entry. Instead of sending the context to the secure element directly, there is an alternative approach wherein the context is sent to a Qkey server, through the qkey API. Here, the qkey server was securely associated with the secure element in an earlier phase. This is a one to one connection. This secure association is used to securely sent the context to the secure element via the qkey server. The qkey server now ensures that the context is shown to the user via the middle ware in this case, and the user can now approve the context with his or her PIN, the PIN is combined with the secured context and secure element performs the operation on the context with the asset. A man in the middle attack is thwarted, because a hash can not be substituted by an attacker.

A improvement to the first setup shown in FIG. 10 could be that when the secure element is associated with the qkey, this association comprises also an association with a user token, such as a mobile phone, tablet or laptop or dedicated hardware, like a Bluetooth dongle or watch. This user token can then be used for display of the context and entry of the PIN. It is possible to activate numerous devices with the same secure element, so it will be easier to replace a secure element with approval of another but same level secure element.

An improvement to this configuration could be that the secure element itself is located on a different location than the location of the device on which the asset is initiated and on which the middleware has been installed The device which communicates with the middleware of the qkey API then also will be associated with the qkey or secure element SE prior to the entry of the context into one of the API's.

The context can now enter into either the middleware or the qkey API, the qkey server now sending the context to the qkey, the key ensures that the context is sent to the SE and the qkey ensures that the context is displayed to the user is displayed and a user consent is acquired by an authentication check, e.g. by entering a a PIN. After PIN entry by the user, the qkey ensures the assets performs its operation on the previously prepared context in the secure element. The context can be a transaction or a digital signature or another operation that a user wishes to be executed.

The device can be a PC, laptop, mobile phone, watch, set-top box, Point or sales terminal, ATM, website of application. The middleware can be a CSP, PKCS#11, radius, LDAP, MS AD, SOAP/oAUTH/Openid identity provider or similar. The qkey API can be implemented as a webservice or any other suitable abstraction.

The qKey is an application, possibly on a networked computing device possibly attached to a hardware security model HSM for secure crypto storage, or completely implemented in a HSM, which is attached to a network and which implements the qKey API, possibly with a middleware intermediate in front.

The secure element can be a SIM in a mobile phone, a smart card in a laptop, a secure execution environment in a processor as separate chip in a motherboard etc. The display and (software)keyboard can be intermediated via the middle ware or on a mobile phone.

The Asset can be information, a secret and cryptographic secret, a symmetric cryptographic secret, an asymmetric cryptographic secret, a biometric template or something other, possibly of value to the user, related to the secure element. Preferably, when something physical is attached to the secure element, the use of that asset is controlled in a similar fashion.

The secure association of the qkey with the secure element and the display and pin entry device can have the following options.

Statically, where the association is performed at a prior phase, in a possibly secure environment. Dynamically, where in one embodiment the secure element generates the asset and an activation announce message or nonce implying a number used once. This activation announce message is then exported from the secure element and then distributed to the display and pin entry device, where this announce message is entered. The display and the pin entry device can be established using zero-knowledge proves, diffie-helman or any other key-establishment protocols resulting in a shared secured or there form of a secure connection with the secure element. As an example, a secure connection can be obtained using a method as described above.

In a particular embodiment, a process may include the following protocol.

Principals
an unregistered device C (e.g. a telephone used for display and pin entry)
a Secure element component G(e.g. HSM, secure element)
a dispatcher component D(qkey)
Context
Gateway G has a public key PK(G) which is known to device C Device C has a nonce N, know to G.
There is an open subscription request with said nonce N and associated token T on Dispatcher
Steps
C generates a fresh nonce NC and a temporary encryption key K
C sends to G: (NC, K, N) encrypted with PK(G)
G decrypts the message with the private key associated to PK(G)
G executes the following protocols, which result in G having NS and T
Subscribing to the open subscription
G sends to D: N
D ensures that the nonce N is linked to an open subscription, and if so,
D sends to G: T
Establishing the key and linking it to the subscription
G generates a fresh nonce NS, associated to T and NC
G computes the communication key from NC and NS and stores it with T
G sends to C: (NC, NS, T) encrypted with K
C decrypts the previous message with K
C computes the communication key from NC and NS Such an association can also be statically and dynamically be established between middleware and qkey API, middleware and secure element, middleware and display and Pin entry device, or between qKey API and display and Pin entry device and between qkey api and secure element.

Figure 11:
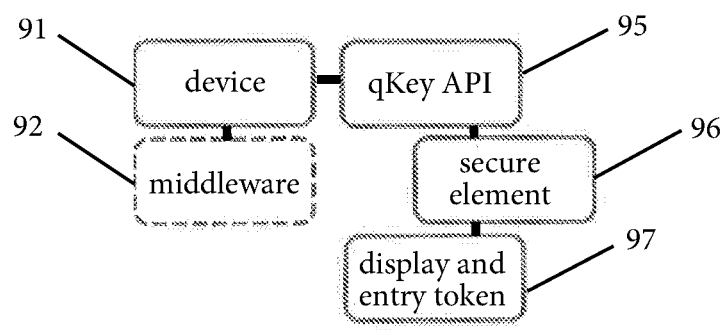
FIG. 11 shows a second setup according to an embodiment of the invention, in which a secure element is located in a datacenter, where also the qKey is located.

When the middleware and display and Pin entry device have establishing a secure association this is also referred to as an identification on the middleware side and a device addition on the display and Pin entry token side. FIG. 11 shows a second setup according to an embodiment of the invention. In this advantageous embodiment, a secure element 96 is located in a datacenter, where also the qkey is located. The secure element 96 is implemented in software in a HSM and contains the public key of the qkey and a private exclusive to it selves. The secure element and the qkey are statically associated, knowing each others public keys. On the secure element an asset is created, the asset being an asymmetric public private key pair and an activation an announce message. Optionally, a second public key is pre-stored in the secure element, used to encrypt the activation announce message. The display and entry token can be implemented as an app on a user token such a mobile phone. This user token is associated with the qkey. The activation announce message is entered on the display and entry token 97. If it was encrypted, it has to be decrypted with the private key. This private key could be located in a secure printing facility used to print it on tamper prove paper and stored in a closed tamper evident envelope and the activation announce message could be distributed to the user and only given to the user once the identity of the user is established with sufficient security. When an activation was successful it is possible to create another user token on a different device, like phone or tablet with the same association with the qKey server, or a new association, based in the original association, or simply linked to the original association, or just reuse some data that was established in relation to the association, i.e. someone's identity. After the display and the entry token establishes a secure association with the secure element, using the activation announce message to the secure element, the qKey orchestrates the message exchange.

The app on the user token may have three functions, viz receiving messages from qkey or secure element, displaying context to the user and secure entry of a authentication result, such as a user PIN. The authentication result could be a PIN, a biometric element of the user or a second device, for instance a Bluetooth device in possession of the user queried by the app for presence or user input.

To facilitate secure use of the app, the app has a secure association with the qkey and/or the secure element and/or middleware and the apps stores this association securely, by use of cryptography, possibly obfuscated cryptography to prevent disclosure of the association.

The app is also obfuscated to itself to prevent decryption and use of the association. The obfuscation of the association and the obfuscation of the app can be uniquely generated for each device during associating and can be update on regular intervals.

Preferably, the app checks it's own integrity. One way to check the integrity is by calculating a hash and verifying that this hash is correct. The app may checks it's environment, e.g. by way of reading environment identifying or partially identifying data and comparing this with previously stored data or uploading this to a verification services. The app can be registered on a network. This registration can be push-messaging, GSM SMS or IP network. Part of the association with the qkey or the secure element is the address that belongs to this network registration. In a preferred embodiment, when context is sent to the display and entry token it is always sent to this address, preventing cloning of the app onto another device. The app actively monitors the mobile phone. If the app detects that the phone is compromised, a malice app is present, or when a hostile heuristic is detected, it notifies the qkey of this fact and/or ceases operation, and/or wipes security sensitive parameters. App may use SSL for secure communication and SSL certificate pinning to prevent SSL vulnerabilities. Additionally, the app uses different facilities offered by the OS such secure cryptographic key storage to leverage any additional measure also offered by (the OS of) the user token. Also the qKey server and the device may communicate via SSL. Preferably, the qKey server and/or the secure element sends a message including context to a pre-specified address of the app, so that it is counteracted that the message is delivered at a app clone. This can e.g. be accomplished using a push message, SMS message or via an IP address.

Additionally, in order to prevent trivial attacks a customer keyboard is used, possibly in such an arrangement that the location of the symbols or the location input or direction of the user input doesn't disclose the inputted symbol.

The association of middleware with the qkey of the display and login token, can take many forms, the preferred form is through the identification announce message introduced earlier. This announce message can subsequently be used, to establish an end-2-end secure connection between the mobile phone where the app that acts as a display and login token resides and the device which uses or communicated with the middle ware. As an alternative, an existing username password can be used, where the qkey is used as a second factor.

The asset used determines what the context is and how rich this context is and also what the key elements are that are crucial to display to the user, to make a informed decision whether or not the user wants the asset to perform the operation on the context. For instance when the asset is an RSA private key for authentication, then de context can be a HASH to prove possession of the key, but also a logo to be displayed on the mobile phone and/or a URL, user-agent, IP address timestamp, service description geolocation etc.

The user process of the mobile phone can be as follows:
1. Originally, the context is bound to the asset in the secure element,
2. After reception of an secured and addressed message the app displays the context to the user, or at least a part of the context that is relevant for the user for this type of asset operation,
3. the user gives his approval,
4. After the user approval the secure element performs the operation.

The secure element contains the asset. To facilitate many users, the secure element is enhanced in such a way that the asset can be securely taken out of the secure element and inserted again when it is needed. One way to do this is to generate a symmetric key in the secure element and use this symmetric key with AES in OCB mode. If this symmetric key is only known in the secure element/HSM then the asset is as secure outside the HSM as inside. If this means of securing is the insertion and removal of an asset is securely replicated in control way among HSM a scalable solution is achieved. When this means can be backed up in a secure manner, for instance using smartcards, a business continuity is achieved. The HSM where the asset is located, can also count wrong PIN attempts or activation announce messages, and block operation when to many wrong tries are performed.

When along with the secure association of the secure element with the qkey, some form of attributes and addressing can additionally be established. The secure element could for instance be deployed in the owners own home, where the qkey based on the context in the request can determine where secure element is located and route it there. Thus an end user doesn't have to trust the qkey service operator with his assets. Multi-tenancy can be achieved when secure element can have different symmetric keys associated with different customers to enable to load distinction collections of assets, thus achieving multi tenancy and economies of scale. The above defined methods can be performed using dedicated hardware structures, such as FPGA and/or ASIC components. Otherwise, the methods can also at least partially be performed using a computer program product comprising instructions for causing a processing unit of the first entity, the second entity and the intermediate node to perform the above described steps of the methods according to the invention. All steps of a method can in principle be performed on a single processor. However, it is noted that in advantageous embodiments according to the invention, steps are performed on separate processing units. As an example, the step of deriving a secret key can be performed on a separate processing unit.

According to an aspect a method is provided for performing an instruction on a platform application, comprising the steps of:
preparing a persistent instruction on a user workplace application that is remotely connected to the platform application;
forwarding the persistent instruction to the platform application;
setting up a secure connection between the platform application and an authentication device;
performing an authorization dialog between the transaction system application and the authentication device; and
executing the transaction instruction only when the authorization dialog has successfully finished.

The step of setting up a secure connection between the platform application and the authentication device can be performed as described above. However, also other methods of setting up the secure connection are applicable. As an example, the platform application is a transaction system application and the instruction is a transaction instruction.

According to a further aspect, a platform application is provided that is remotely connected to a user workplace application and that has a secure connection with an authentication device, the platform application comprising a processor that is arranged for:
receiving a persistent instruction prepared on the user workplace;
performing an authorization dialog with the authentication device, via the secure connection; and
executing the instruction only when the authorization dialog has successfully finished.

According to yet a further aspect, a computer program product is provided for performing an instruction on a platform application, the computer program product comprising computer readable code for facilitating a processing unit to perform the steps of:
preparing a persistent instruction on a user workplace application that is remotely connected to the platform application;
forwarding the persistent instruction to the platform application;
setting up a secure connection between the platform application and an authentication device;
performing an authorization dialog between the transaction system application and the authentication device; and
executing the instruction only when the authorization dialog has successfully finished.

It will be understood that the above described embodiments of the invention are exemplary only and that other embodiments are possible without departing from the scope of the present invention. It will be understood that many variants are possible.

Such variants will be apparent for the person skilled in the art and are considered to fall within the scope of the invention as defined in the following claims.

The invention claimed is:
1. A method for performing an instruction on a platform application, comprising the steps of:
preparing a persistent instruction on a user workplace application that is remotely connected to the platform application;
forwarding the persistent instruction to the platform application;
performing an authorization dialog between the platform application and a user authentication device, via a secure connection set up between the platform application and the user authentication device; and
executing the persistent instruction only when the authorization dialog has successfully finished,
wherein the secure connection has been set up by steps comprising:
receiving, by an intermediate node in connection with the user authentication device and the platform application, respectively, a primary first encoded string from the user authentication device or the platform application, respectively, the primary first encoded string obtained by applying a one-way function or a similar function to a first string or to a derivative thereof, the first string being derived from a first random number generated by the user authentication device or the platform application, respectively, the first string being exported from the user authentication device or the platform application, respectively, via a first I/O interface of the user authentication device or the platform application, respectively;
receiving, by the intermediate node, a secondary first encoded string from the platform application or the user authentication device, respectively, the secondary first encoded string being obtained by applying a one-way function or a similar function to the first string or to a derivative thereof, the first string being received, via a second I/O interface, by the platform application or the user authentication device, respectively;
upon verifying that the primary first encoded string and the secondary first encoded string are the same, authorizing the user authentication device and the platform application, thereby setting up the secure connection.

2. The method according to claim 1, wherein the secure connection between the platform application and the user authentication device is set up by providing a secure session between a first entity and a second entity, the first and the second entity being the user authentication device and the platform application, respectively, or vice versa, the method being performed by the first entity and comprising the steps of:
generating the first random number;
exporting the first string derived from said first random number, to a user for entering the first string into the second entity;
applying the one-way function or similar function to the first string or to a derivative thereof, obtaining the primary first encoded string;
transmitting the primary first encoded string to the intermediate node that is in connection with the first entity and the second entity,
the method further comprising the steps of:
generating a second random number, deriving the second string from said second random number, obtaining the secondary first encoded string from the second string, transmitting the secondary first encoded string to the intermediate node, and transmitting the second string to the second entity if a verifying step of comparing the primary first encoded string with the secondary first encoded string transmitted by the intermediate node to the first entity and the second entity has a positive result, or
receiving from the second entity the second string being derived from the second random number generated by the second entity,
the method further comprising the step of:
deriving a secret key from the first and the second string.

3. The method according to claim 1, wherein the secure connection between the platform application and the user authentication device is set up by providing a secure session between a first entity and a second entity, the first and the second entity being the user authentication device and the platform application, respectively, or vice versa, the method being performed by the second entity and comprising the steps of:
receiving, via the first I/O interface, the first string derived from the first random number generated by the first entity;
applying the one-way function or similar function to the first string or derivative thereof, obtaining the primary first encoded string;
transmitting the primary first encoded string to the intermediate node that is in connection with the first entity and the second entity;
the method further comprising the steps of:
generating a second random number, deriving the second string from said second random number, obtaining the secondary first encoded string from the second string, transmitting the secondary first encoded string to the intermediate node, and transmitting the second string to the first entity if a verifying step of comparing the primary first encoded string with the secondary first encoded string transmitted by the intermediate node to the first entity and the second entity has a positive result, or
receiving from the first entity the second string being derived from the second random number generated by the first entity,
the method further comprising the step of:
deriving a secret key from the first and the second string.

4. The method according to claim 1, wherein the platform application is a user workplace application, a cloud application, an authentication provider application, or a transaction system application.

5. The method according to claim 2, wherein the first string is the first random number or a random message produced from said first random number, or wherein the second string is transmitted in an encrypted manner, or wherein the intermediate node is an authentication provider securely connected to the user authentication device.

6. The method according to claim 2, wherein, in the step of applying the one-way function or similar function, the derivative of the first string is obtained by performing a hash function to the first string.

7. The method according to claim 1, wherein the secure connection is used to support secure one-way or two-way data transfer, or wherein the authorization dialog includes the steps of:
transmitting a code, from the platform application to the user authentication device for entering the code into the user workplace application;
transmitting the code from the user workplace application to the platform application; and
verifying whether the code received by the platform application is the same as the code transmitted by said platform application.

8. The method according to claim 2, wherein the step of transmitting the second string is implemented by exporting the second string to the user, via the second I/O interface of one of the user authentication device and the platform application, for manually entering the second string into the first I/O interface of the other of the user authentication device and the platform application.

9. The method according to claim 1, further including a step of authorizing a document in a cloud application.

10. The method according to claim 1, wherein the user authentication device includes a cellular phone, PDA, smart card, token or electronic key.

11. A platform application that is remotely connected to a user workplace application and that has a secure connection with an authentication device, the platform application comprising a processor and a non-transitory computer readable medium having instructions for the processor to perform steps of:
receiving a persistent instruction prepared on the user workplace application;
performing an authorization dialog with the authentication device, via the secure connection; and
executing the persistent instruction only when the authorization dialog has successfully finished
wherein the secure connection has been set up by steps comprising:
receiving, by an intermediate node in connection with the authentication device and the platform application, respectively, a primary first encoded string from the authentication device or the platform application, respectively, the primary first encoded string obtained by applying a one-way function or a similar function to a first string or to a derivative thereof, the first string being derived from a first random number generated by the authentication device or the platform application, respectively, the first string being exported from the authentication device or the platform application, respectively, via a first I/O interface for the authentication device or the platform application, respectively;
receiving, by the intermediate node, a secondary first encoded string from the platform application or the authentication device, respectively, the secondary first encoded string being obtained by applying a one-way function or a similar function to the first string or to a derivative thereof, the first string being received, via second I/O interface, by the platform application or the authentication device, respectively;
upon verifying that the primary first encoded string and the secondary first encoded string are the same, authorizing the authentication device and the platform application, thereby setting up the secure connection.

12. The platform application according to claim 11 being a first entity configured for setting up the secure connection with the authentication device being a second entity, the first entity comprising:
a first random number generator for generating the first random number;
the first I/O interface for exporting the first string derived from said first random number, to a user for entering the first string into the second entity;
a processor for applying the one-way function or similar function to the first string or derivative thereof, obtaining the primary first encoded string;
a transmitting unit for transmitting the primary first encoded string to the intermediate node that is in connection to the first entity and the second entity,
the first entity further comprising:
a second random number generator for generating the second random number, wherein the processor is further configured for deriving the second string from said second random number, for obtaining the secondary first encoded string from the second string or derivative thereof, and for transmitting the second string to the second entity if a verifying step of comparing the primary first encoded sting and the secondary first encoded string transmitted by the intermediate node to first entity and the second entity has a positive result, or
a receiver unit for receiving from the second entity the second string derived from the second random number generated by the second entity,
and wherein the processor is further configured for deriving a secret key from the first and the second string.

13. A non-transitory computer readable medium for performing an instruction on a platform application, the non-transitory computer readable medium comprising computer readable code for facilitating a processing unit to perform the steps of:
preparing a persistent instruction on a user workplace application that is remotely connected to the platform application;
forwarding the persistent instruction to the platform application;
performing an authorization dialog between the platform application and an authentication device, via a secure connection set up between the platform application and the authentication device; and
executing the persistent instruction only when the authorization dialog has successfully finished,
wherein the secure connection has been set up by steps comprising:
receiving, by an intermediate node in connection with the authentication device and the platform application, respectively, a primary first encoded string from the authentication device or the platform application, respectively, the primary first encoded string obtained by applying a one-way function or a similar function to a first string or to a derivative thereof, the first string being derived from a first random number generated by the authentication device or the platform application, respectively, the first string being exported from the authentication device or the platform application, respectively, via a first I/O interface of the authentication device or the platform application, respectively;
receiving, by the intermediate node, a secondary first encoded string from the platform application or the authentication device, respectively, the secondary first encoded string being obtained by applying a one-way function or a similar function to the first string or to a derivative thereof, the first string being received, via a second I/O interface, by the platform application or the authentication device, respectively;
upon verifying that the primary first encoded string and the secondary first encoded string are the same, authorizing the authentication device and the platform application, thereby setting up the secure connection.

14. The method according to claim 1, wherein context is shown to a user via a middleware, or wherein a display and pin entry device is implemented as an app on a user token, wherein the app has the functions of:
receiving a message from a qKey server or secure element,
displaying the context to the user, and
secure entry of an authentication result,
or wherein the app is securely associated with the qKey server, secure element and/or middleware; or
is obfuscated to itself; or
checks its own integrity.

15. The method according to claim 14, wherein the step of securely associating the qKey server with the secure element also includes an association with the user token, or wherein the qKey server and/or the secure element sends a message including context to a pre-specified address of the app, or wherein the association is performed statically or dynamically, or wherein the static or dynamic association is established between the middleware and the qKey server, between the middleware and the secure element, between the middleware and the display and pin entry device, between the qKey server and the display and pin entry device, and/or between the qKey server and the secure element, or wherein the static or dynamic association is performed by performing the steps of:

generating, by the secure element, an asset and an activation announce message, exporting the activation announce message from the secure element and entering it to the display and pin entry device.

16. The method according to claim 15, wherein the activation announce message is subsequently used to establish an end-to-end connection between a mobile phone having the app and the display and pin entry device which uses or communicates with the middleware.

17. The method according to claim 7, wherein the secure one-way or two-way data transfer is a transfer of a message, a decryption and/or encryption key, or an authorization dialog.

* * * * *